United States Patent [19]

Shibahara

[11] Patent Number: 5,217,162

[45] Date of Patent: Jun. 8, 1993

[54] COMMUNICATION MEDIUM SUCH AS POSTCARD AND METHOD OF MANUFACTURING THE SAME

[75] Inventor: Kenji Shibahara, Osaka, Japan

[73] Assignee: Kabushiki Kaisha Challenge Five, Osaka, Japan

[21] Appl. No.: 979,428

[22] Filed: Nov. 19, 1992

Related U.S. Application Data

[63] Continuation of Ser. No. 685,615, Apr. 15, 1991, abandoned.

[30] Foreign Application Priority Data

Apr. 18, 1990 [JP] Japan .................................. 2-104279
May 11, 1990 [JP] Japan .................................. 2-121445

[51] Int. Cl.5 ............................................ B65D 27/00
[52] U.S. Cl. .................... 229/92.8; 283/106; 283/107
[58] Field of Search ............... 283/100, 101, 106, 107, 283/109, 110; 229/92.8

[56] References Cited

U.S. PATENT DOCUMENTS 4,742,954 5/1988 Shishido ........................... 229/92.8
4,885,198 12/1989 Kimura .......................... 229/92.8 X
4,938,506 7/1990 Matsuguchi et al. ........... 283/101 X
5,011,190 4/1991 Matsuguchi et al. ............... 283/101

FOREIGN PATENT DOCUMENTS 214484 8/1989 Japan .................................. 283/106
214485 8/1989 Japan .................................. 283/101

Primary Examiner—Stephen P. Garbe
Assistant Examiner—Jes F. Pascua
Attorney, Agent, or Firm—Koda and Androlia

[57] ABSTRACT

A communication medium such as a postcard in which surfaces on which information, e.g., communication sentences is shown are bonded by heating with a synthetic resin film or the like interposed therebetween to send the information while concealing the information and other printed contents, a method of manufacturing this communication medium, and a communication medium intermediate sheet including a synthetic resin film or the like interlaid in the postcard. The synthetic resin film interlaid in the communication medium can be torn apart. The provision of such a film capable of being torn facilitates the operation of cutting off communication medium units of the postcard size and enables the receiver to easily dispose of the communication medium by tearing the same into pieces after unsealing the communication medium and reading the secret information.

3 Claims, 17 Drawing Sheets

FIG.1(a)
FIG.1(b)
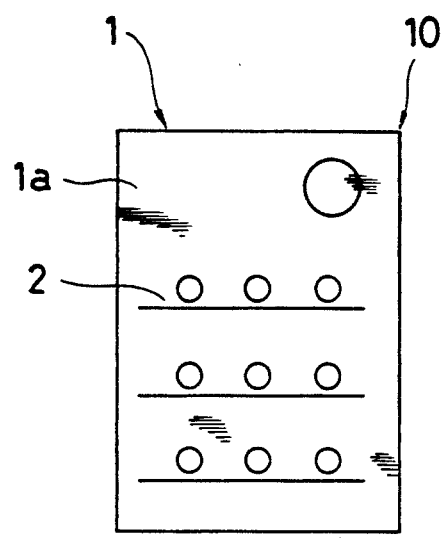
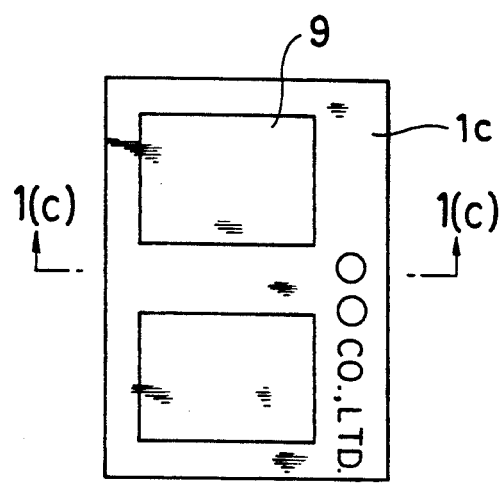
FIG.1(c)
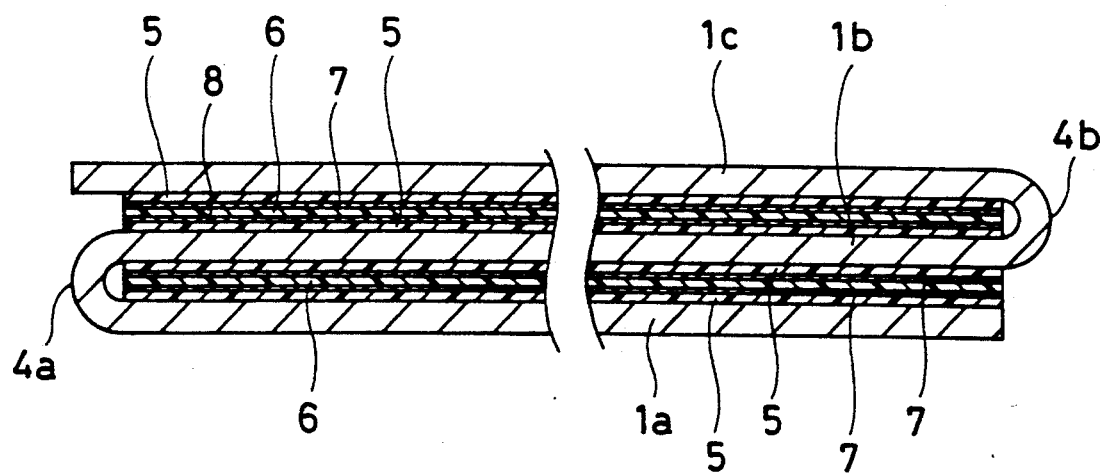

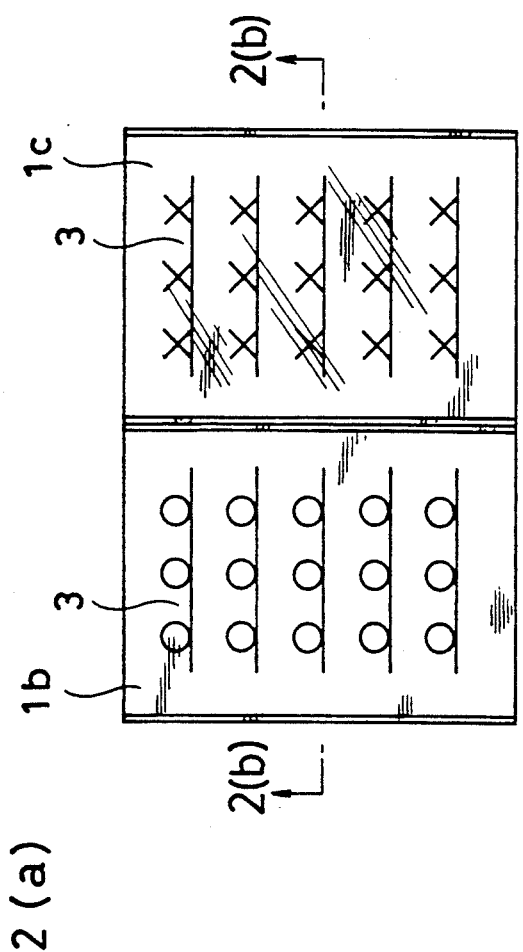
F I G. 2(a)
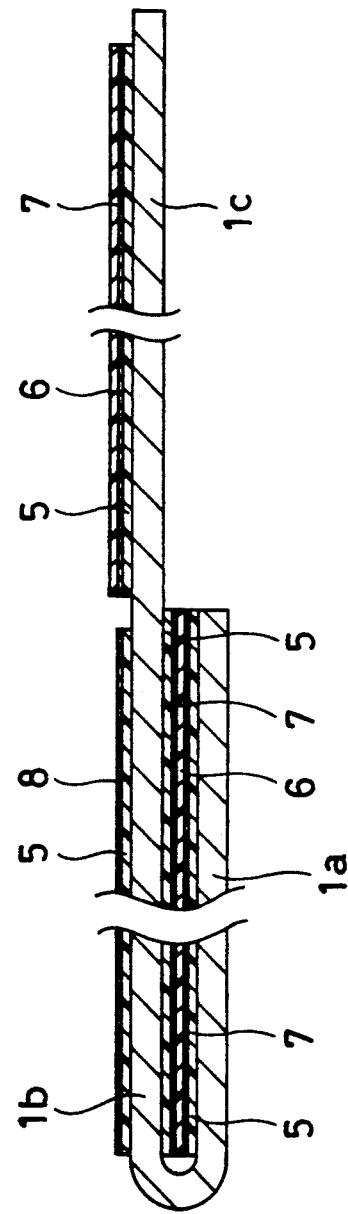
F I G. 2(b)

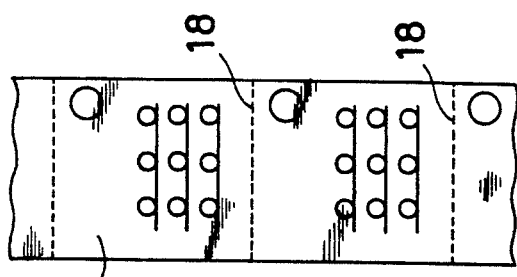
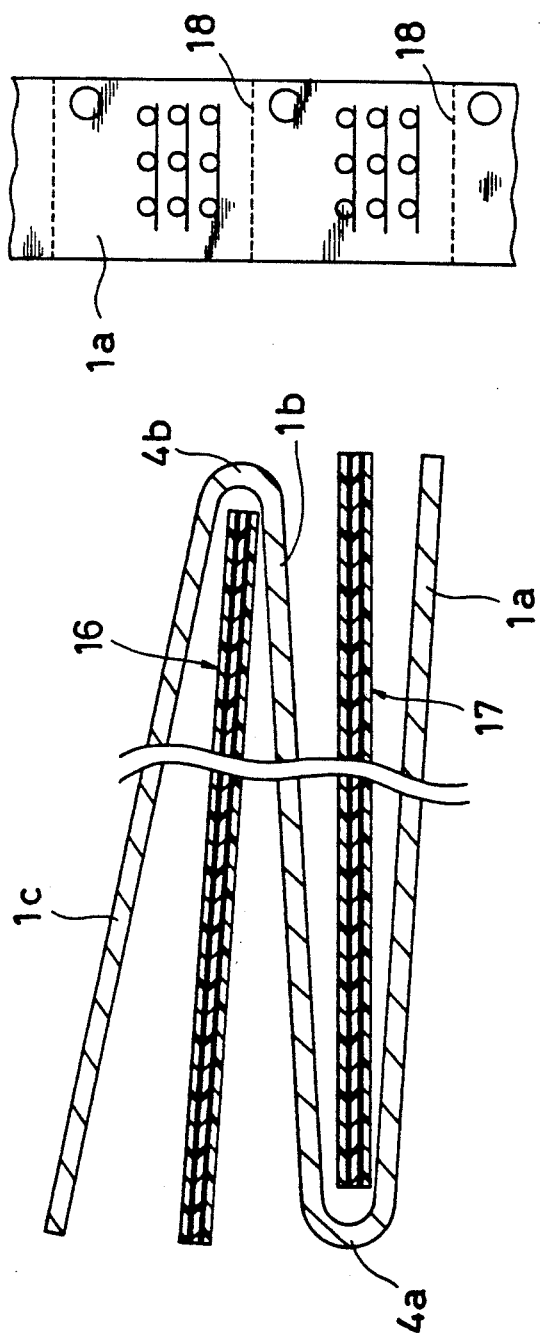
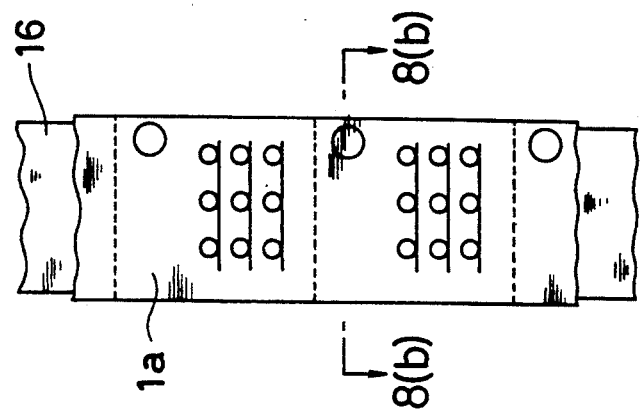

F I G. 12 (a)
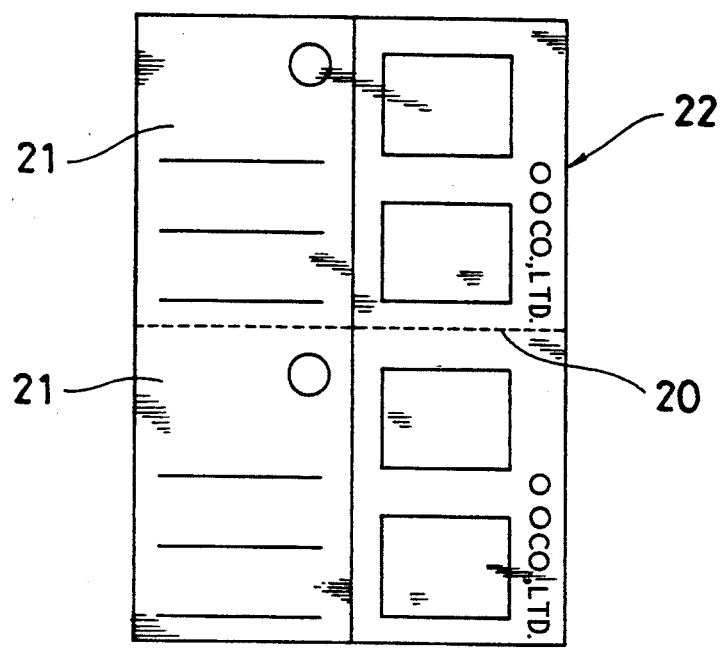
F I G. 12 (b)
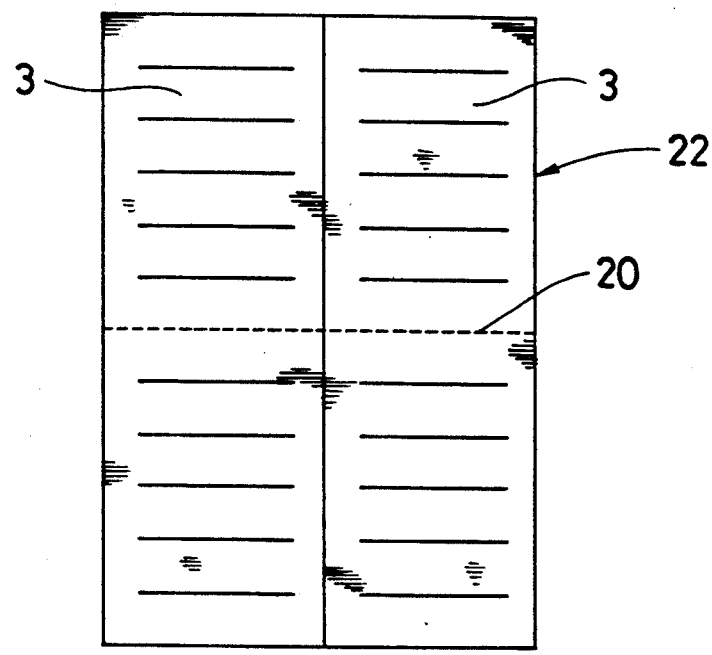

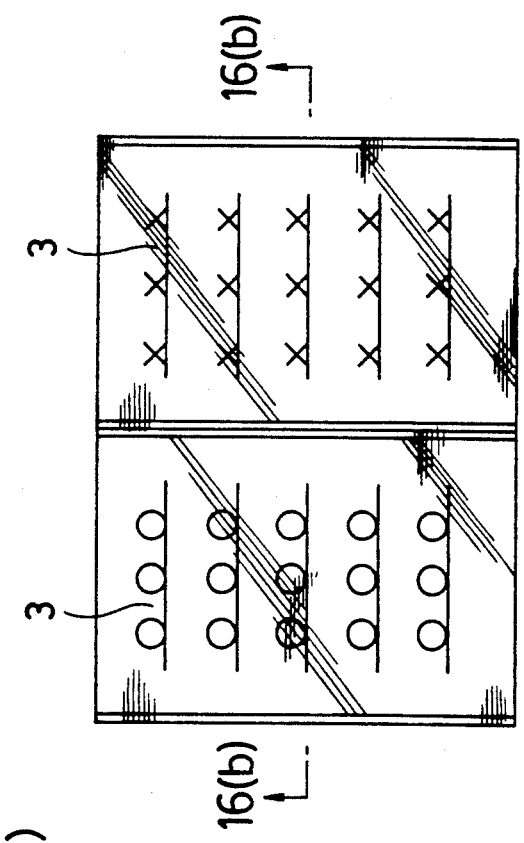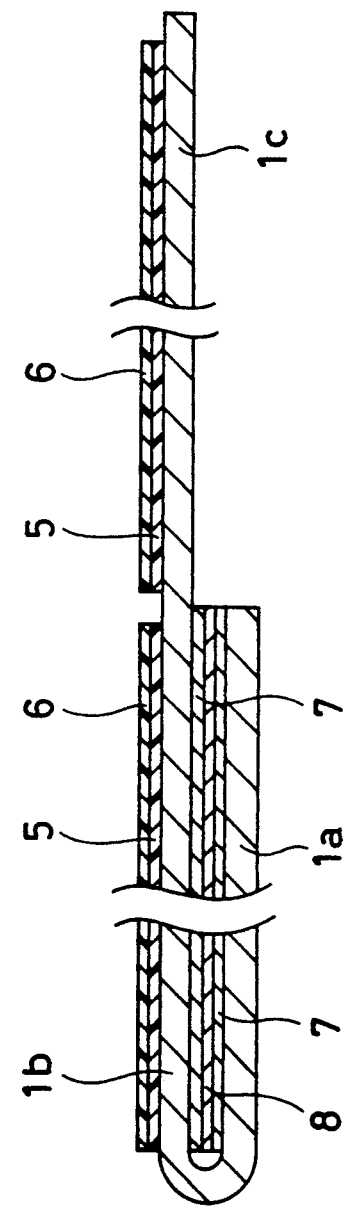
FIG. 16(a)
FIG. 16(b)

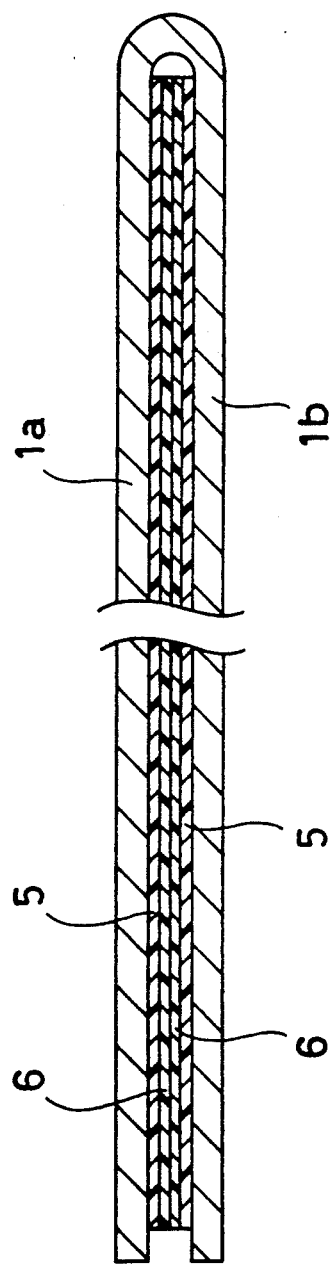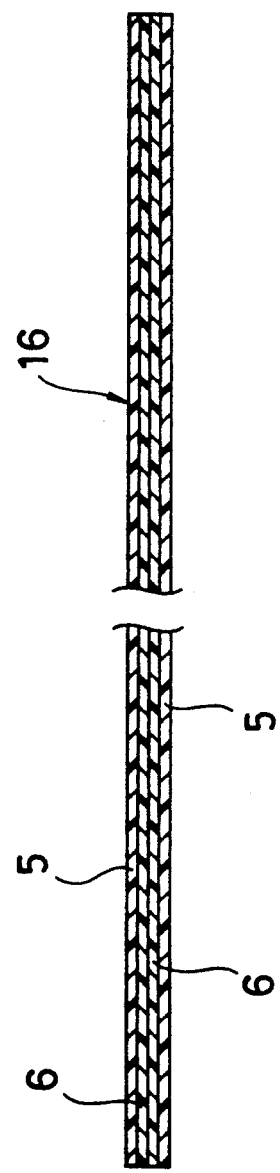

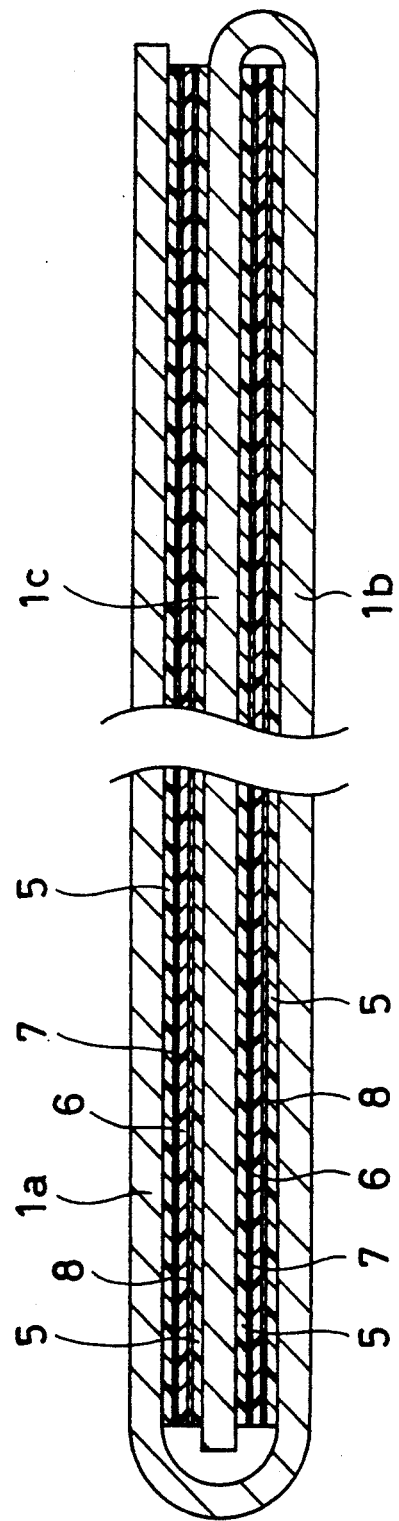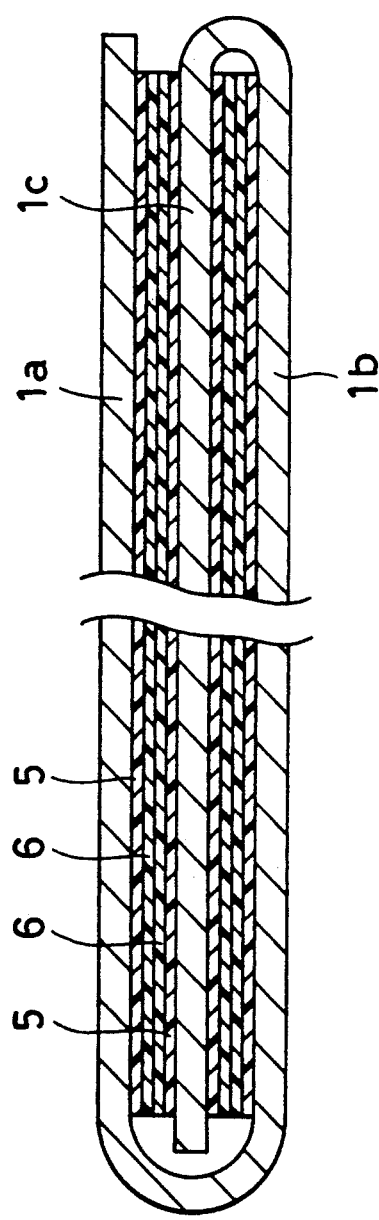

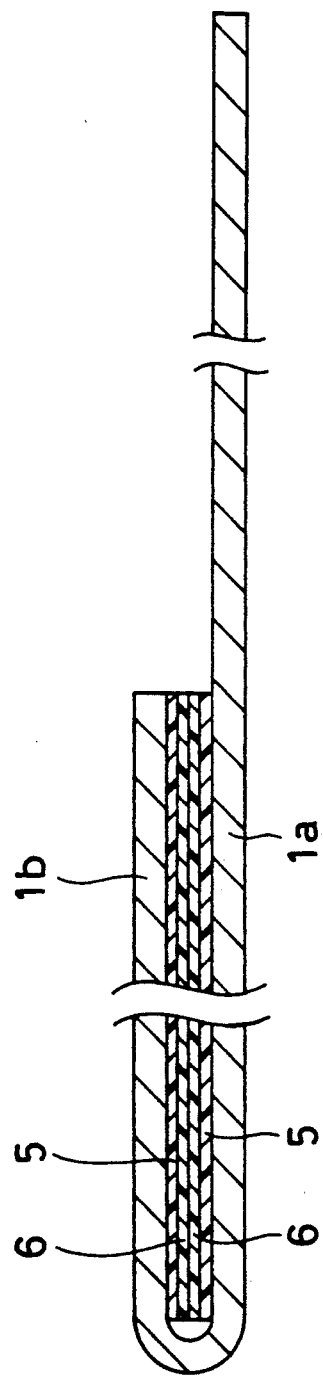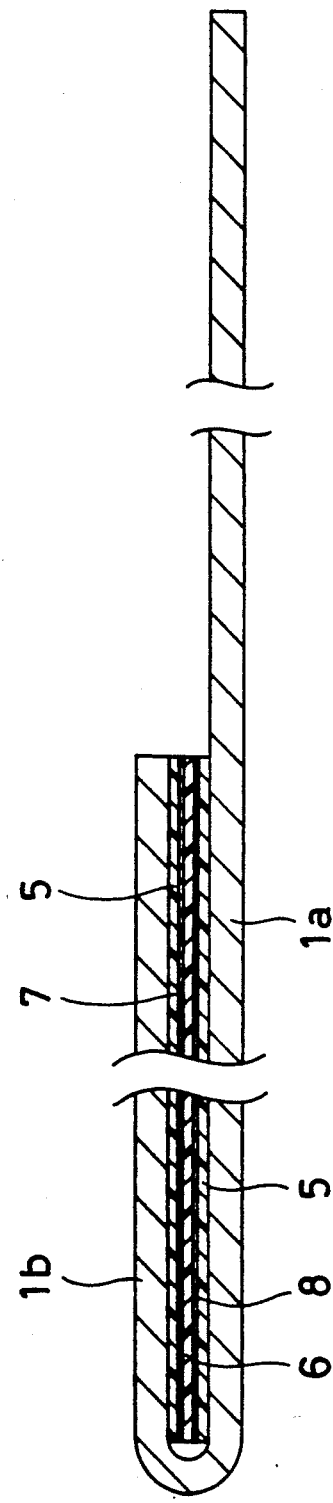

COMMUNICATION MEDIUM SUCH AS POSTCARD AND METHOD OF MANUFACTURING THE SAME

This is a continuation of application Ser. No. 685,615 filed Apr. 15, 1991, now abandoned.

BACKGROUND OF THE INVENTION

This invention relates to a communication medium such as a postcard, a method of manufacturing this communication medium and an intermediate sheet for this medium. More particularly, this invention relates to a communication medium in the form of a postcard or the like having surfaces on which information or the like is shown are separably bonded by, e.g., heating through a synthetic resin film or the like, a method of manufacturing this medium and an intermediate sheet formed of a synthetic resin film or the like interposed between medium portions.

An example of this type of a postcard having inner surfaces bonded by interposing a synthetic resin layer is disclosed in Japanese Patent Laid-Open No.64-16691.

In this postcard, as shown in FIG. 23(a), films 24 are provided on the inner surfaces of two sheet portions 1e and 1f constituting a postcard member 1d, with layers of adhesive 23 interposed therebetween, and the films 24 are separably bonded through a pseudo adhesive layer 25.

However, this type of postcard is manufactured in such a manner that a pseudo adhesive lamination 27 of a predetermined size having a plurality of layers including synthetic resin films 24 and adhesive layer 23, and separation sheets 26 provided on the two outer surfaces of this lamination is provided, and that the pseudo adhesive lamination is interposed between the twice-folded portions of the postcard sheet after separating the separation sheets 26, thereby bonding these portions. It is therefore necessary to interpose and attach such a pseudo adhesive lamination 27 of a predetermined size with respect to each postcard sheet. For this reason, it is not possible to conduct the whole postcard manufacture process continuously and automatically.

On the other hand, elongated pseudo adhesive lamination 27 may be used along with a lengthwise sheet of paper to enable postcards to be manufactured successively and automatically. The process of manufacturing postcard using a lengthwise sheet necessarily includes a step of cutting the sheet.

However, since the pseudo adhesive lamination 27 includes synthetic resin films 24, the existence of the films 24 renders the cutting operation difficult. It is therefore difficult to adopt a continuous postcard manufacture process to manufacture postcards having such a pseudo adhesive lamination.

Moreover, when this type of postcard is disposed of by being torn into pieces, it is difficult to torn apart the communication medium since the communication medium cannot be torn easily owing to the films interlaid therein. If, for example, the information contained in the postcard is to handled with certain secrecy, that is, it is necessary to tear the postcard into small pieces for disposal, this operation must be performed by separately preparing a cutting tool such as scissors, which is very troublesome.

In any case, the above-described films are interlaid in the conventional postcards, and there are therefore the problem of difficulty in cutting the postcard at the time of disposal as well as the cutting operation of the process using a lengthwise sheet.

SUMMARY OF THE INVENTION

In view of the above-described problems, an object of the present invention is to provide a postcard which can be continuously and automatically manufactured although a synthetic resin film is provided therein, and which can be torn apart easily for disposal.

To achieve this object, according to the present invention, there are provided a communication medium such as a postcard, methods of manufacturing this communication medium, and intermediate sheets for the communication medium. The communication medium comprises a communication medium member formed of a sheet of paper having at least two sheet portions which can be folded in; and at least one synthetic resin film interposed between the sheet portions and each of which can be torn apart, wherein the sheet portions are bonded to each other through the film so as to be separable from a position on one surface of the film.

One of the intermediate sheets is characterized in that a communication medium member formed of a sheet of paper consists of at least two sheet portions which can be folded in, a synthetic resin film which can be torn apart is interposed between these sheet portions, and the sheet portions are bonded to each other through the film so as to be separable from a position on one surface of the film.

Another of the intermediate sheets is an intermediate sheet for a communication medium such as a postcard, which is interposed between sheet portions of a communication medium member formed of a sheet of paper which sheet portions can be folded in. The intermediate sheet comprises two synthetic resin films each of which can be torn apart, the films being separably attached to each other on their surfaces; and synthetic resin layers formed on the outer surfaces of the films.

One of the communication medium manufacture methods comprises the steps of transporting a lenghwise sheet of paper having split means such as to be split into communication medium forming pieces; transporting over the paper sheet a lengthwise intermediate sheet including a synthetic resin film which can be torn in the direction perpendicular to the direction of transportation of the paper sheet; interposing the intermediate sheet between portions of the paper sheet while folding the same in the longitudinal direction; separably bonding the inner surfaces of the paper sheet facing each other through the intermediate sheet by heating; and splitting the paper sheet into the communication medium forming pieces by the split means while tearing the intermediate sheet in the direction along the shorter side of the lengthwise paper sheet.

Another of the manufacture method comprises the steps of transporting sheets for forming a multiplicity of communication medium members each of which can be folded in at least two; transporting over the communication medium sheets a lenghwise intermediate sheet formed of a synthetic resin layer which can be torn apart in the direction of intersection across the direction of transportation of the communication medium sheet, a synthetic resin layer formed on one surface of the film with a strong adhesive applied therebetween, and another synthetic resin layer formed on the other surface of the film with a weak adhesive applied therebetween; interposing the intermediate sheet between portions of the multiplicity of communication medium sheets while folding the same in the longitudinal direction; separably heat-bonding the inner surfaces of the communication medium sheets facing each other through the intermediate sheet by heating; and splitting the communication medium sheets into the communication medium members of a standard size as desired while tearing the intermediate sheet in the direction along the shorter side of the communication medium sheet.

In accordance with the present invention, a film which can be torn apart is interlaid in the postcard member, as described above. To manufacture a postcard having such a structure, a lengthwise sheet of film which can be torn apart is provided and is interposed between inner surfaces of folded portions of a lengthwise sheet of paper having post card forming portions or a sheet of a predetermined size from which postcards are formed. The inner surfaces thereof are thereby bonded to each other. The lengthwise film can thereafter be torn easily by a tensile force without using any cutting machine or tool separately provided. The communication medium can therefore be manufactured by this continuous automatic communication medium manufacture process, even though the film is interlaid.

The communication medium thus manufactured can be torn easily, since the intermediate film can be torn apart.

Accordingly, when the communication medium is torn into pieces for disposal after the information displayed on the communication medium has been read, the communication medium can easily be disposed of by being torn, since the film is easy to tear apart.

In the postcard thus formed, the sheet portions can be separated by interlaminar peeling between the weak adhesive and the film. The postcard can therefore be unsealed by the effect of interlaminar peeling to unfold the sheet portions, thereby enabling the information to be read.

BRIEF DESCRIPTION OF THE DRAWINGS

FIGS. 1(a) to 1(e) show a postcard in accordance with a first embodiment of the present invention;
FIG. 1(a) is a front view;
FIG. 1(b) is a rear view;
FIG. 1(c) is an enlarged cross-sectional view taken along the line A—A of FIG. 1(b);
FIG. 1(d) is a diagram of the obverse surface in an unfolded state;
FIG. 1(e) is a diagram of the reverse surface in an unfolded state;
FIGS. 2(a) and 2(b) show an unsealed state;
FIG. 2(a) is a front view;
FIG. 2(b) is an enlarged cross-sectional view taken along the line B—B of FIG. 2(a);
FIGS. 4 to 10 show a method of manufacturing the postcard;
FIG. 4 is a schematic side view of a roll of paper;
FIG. 5(a) is a plan view;
FIG. 5(b) is a bottom view;
FIG. 6 is a schematic plan view of a printing step;
FIG. 7 is a schematic plan view of a step of cutting off edge portions;
FIGS. 8(a) and 8(b) show a step of folding the postcard sheet and interposing the intermediate sheet;
FIG. 9 is a schematic diagram of a bonding step;
FIG. 10 is a schematic plan view of a cutting step;
FIGS. 12 to 14 show a method of manufacturing the postcard of the fourth embodiment;
FIG. 12(a) is a front view of a paper sheet;
FIG. 12(b) is a rear view of the paper sheet;
FIG. 13 is a plan view of a step of transporting a film;
FIG. 14 is a plan view of a step of folding the sheet;
FIGS. 16(a) and 16(b) show an unsealed state of the postcard shown in FIG. 15;
FIG. 16(a) is a front view;
FIG. 16(b) is a enlarged cross-sectional view taken along the line D—D of FIG. 16(a);
FIG. 17 is an enlarged cross-sectional view of a seventh embodiment of the present invention;
FIG. 18 is an enlarged cross-sectional view of an example of a sheet interlaid in the postcard member of the sixth embodiment;
FIGS. 19 to 22 are enlarged cross-sectional views of other embodiments of the present invention;
FIG. 23(a) is an enlarged cross-sectional view of the postcard.

DESCRIPTION OF THE PREFERRED EMBODIMENTS

Embodiments of the present invention will be described below.

EMBODIMENT 1

Figure 1D:
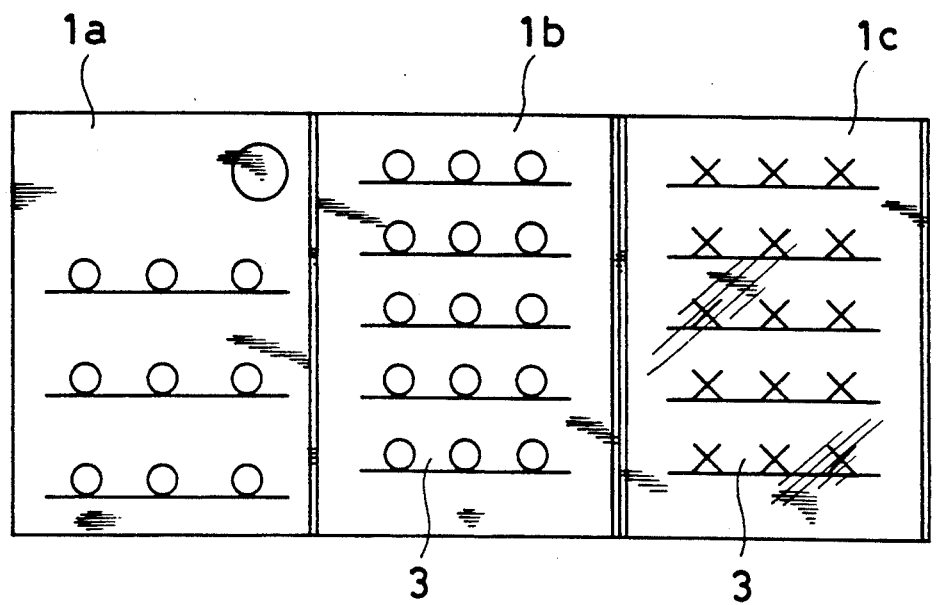
Figure 1E:
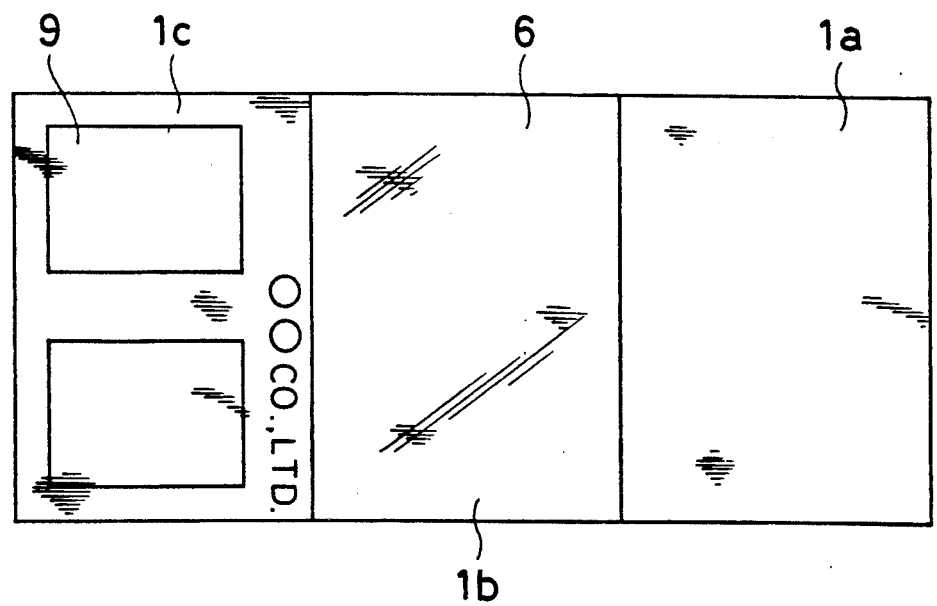

Referring to FIG. 1, a postcard member 1 formed of a sheet of paper consisting of first to third sheet portions 1a, 1b, and 1c successively arranged and each having the size of one postcard. An address display section 2 is provided on the obverse surface of the first sheet portion 1a, and an address is displayed in this section by printing characters. Information display sections 3 are provided on the obverse surfaces of the second and third sheet portions 1b and 1c, and information such as communication sentences are displayed in these sections by printing characters.

The second and third sheet portions 1b and 1c on which information display sections 3 are provided are folded at a fold portion 4b so that the information display sections 3 are located inside. A layer 5 of a synthetic resin comprising ethylene-polyvinyl acetate copolymer resin and a layer of a strong adhesive 7 are laminated on the inner surface of the sheet portion 1c, while another layer 5 of a synthetic resin layer comprising ethylene-polyvinyl acetate copolymer resin and a layer of a weak adhesive 8 are laminated on the inner surface of the sheet portion 1b. A biaxially oriented polypropylene film 6 [Pylen Film ET, commercial name of a product of Toyobo Co., Ltd] which can be torn in on direction is interposed between the layers of strong adhesive 7 and weak adhesive 8.

The sheet portions 1b and 1c are separably bonded to each other so that interlaminar peeling can occur between the weak adhesive 8 and the film 6.

Further, the first sheet portion 1a and the second sheet portion 1b are folded at a fold portion 4a so that the address display section 2 is located outside. A layer 5 of a synthetic resin comprising ethylene-polyvinyl acetate copolymer resin and a layer of strong adhesive 7 are laminated on the inner surface of each of the two sheet portions 1a and 1b facing each other, and the same biaxially oriented polypropylene film 6 as the film 6 between the sheet portions 1b and 1c, which can be torn in one direction, is interposed between the two layers of strong adhesive 7.

The first and second sheet portions 1a and 1b are non-separably bonded to each other by virtue of this lamination of the synthetic resin layers 5, the layers of strong adhesive 7 and the film 6.

An advertisement section 9 is provided on the reverse surface (outside surface) of the third sheet portion 1c.

As described above, the postcard 10 of this embodiment has the second sheet portion 1b and the third sheet portion 1c bonded so as to be separable by interlaminar peeling between the film 6 and the weak adhesive 8. It is therefore possible to easily separate the sheet portion 1c from the sheet portion 1b to confirm the information in the information display section 3.

On the other hand, the first sheet portion 1a and the second sheet portion 1b are non-separably bonded as described above, so that no interlaminar peeling occurs between the first and second sheet portions 1a and 1b. The two sheet portions 1a and 1b can therefore be handled as one sheet of paper.

Consequently, the whole postcard member 1 is formed as if it is folded in two, and only the information display section which is essentially necessary can be exposed. It is thereby possible for the receiver to see the information display section 3 immediately after unsealing the card.

Further, when the postcard is torn to pieces and and thrown away, the postcard member 1 can easily be torn into pieces by being torn in a transverse direction thereof, since the film 6 interlaid in the postcard member 1 is a biaxially oriented polypropylene film which can be torn in one direction as mentioned above, thereby facilitating the disposal of the postcard. In particular, in the case of a postcard containing information to be handled with certain secrecy, the disposal of the postcard can be effected promptly by tearing the postcard member 1 immediately after the receiver has read the information after unsealing the card. In the above-described embodiment, film 6 is interposed between the first and second sheet portions 1a and 1b along with synthetic resin layers 5 and strong adhesive 7. However, the first and second sheets 1a and 1b may be simply bonded b a adhesive.

The postcard of the above-described embodiment can be handled as a postcard folded into two such that only the second and third sheet portions 1b and 1c are separated from each other to open the card, since the first and second sheet portions 1a and 1b are non-separably bonded. However, the present invention is not limited to this type of structure. The structure between the first and second sheet portions 1a and 1b may be the same as that between the second and third sheet portions 1b and 1c, i.e., a separable structure. In this case, the reverse surfaces of the first and second sheet portions 1a and 1b can be utilized as information display surfaces as well as the obverse surfaces of the second and third sheet portions 1b and 1c, and the information display surface area can be substantially increased.

EMBODIMENT 2

This embodiment includes a postcard intermediate sheet for use in Embodiment 1.

Figure 3:
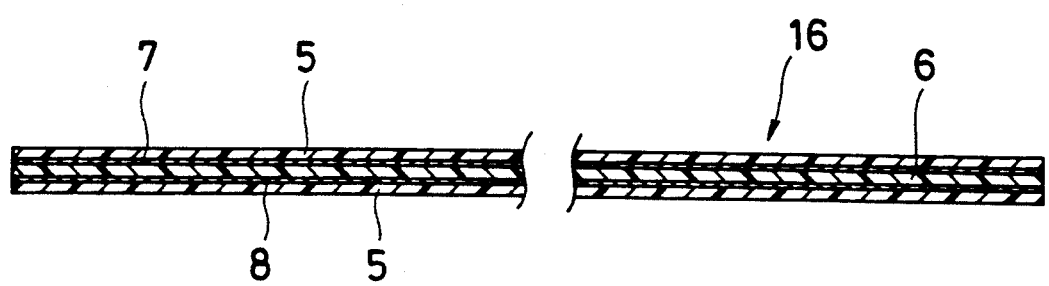
FIG. 3 is an enlarged cross-sectional view of an example of a sheet interlaid in the postcard member.

As shown in FIG. 3, the intermediate sheet 16 has a biaxially oriented polypropylene film 6 which can be torn in one direction, and two layers 5 of a synthetic resin comprising ethylene-polyvinyl acetate copolymer resin. One of the synthetic resin layers 5 is formed on one side of the polypropylene film 6 with a layer of strong adhesive 7 interposed therebetween, while the other synthetic resin layer 5 is formed on the other side of the film 6 with a layer of weak adhesive 8 interposed therebetween.

EMBODIMENT 3

A method of manufacturing a postcard having a structure such as that described above will be described below.

Figure 4:
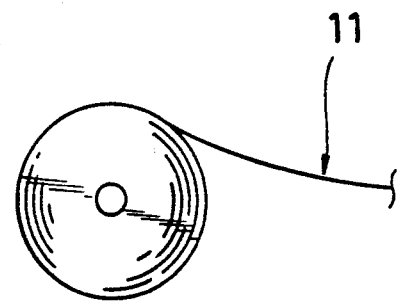
Figure 5A:
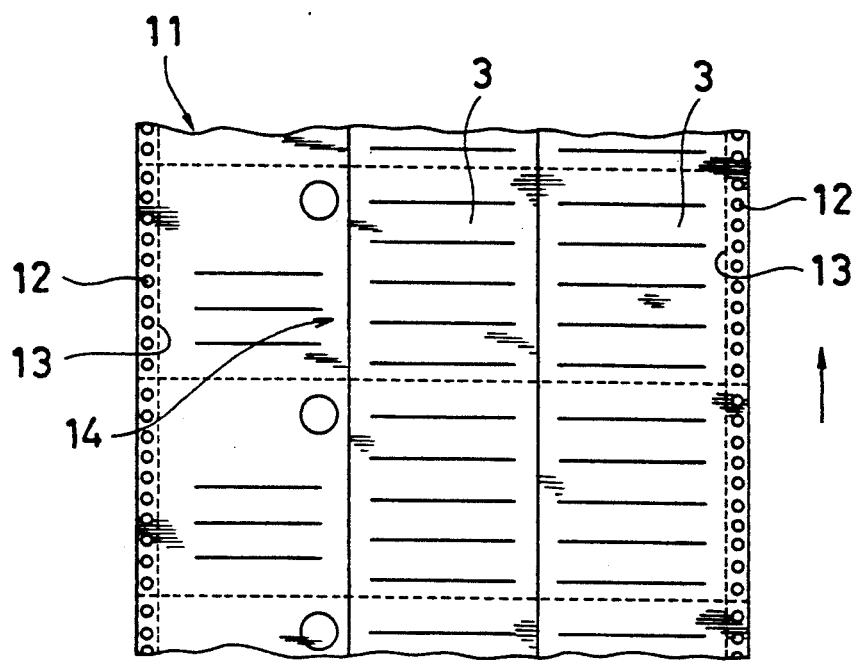
FIGS. 5(a) and 5(b) are schematic diagrams of a step of forming punched holes and perforations.
Figure 5B:
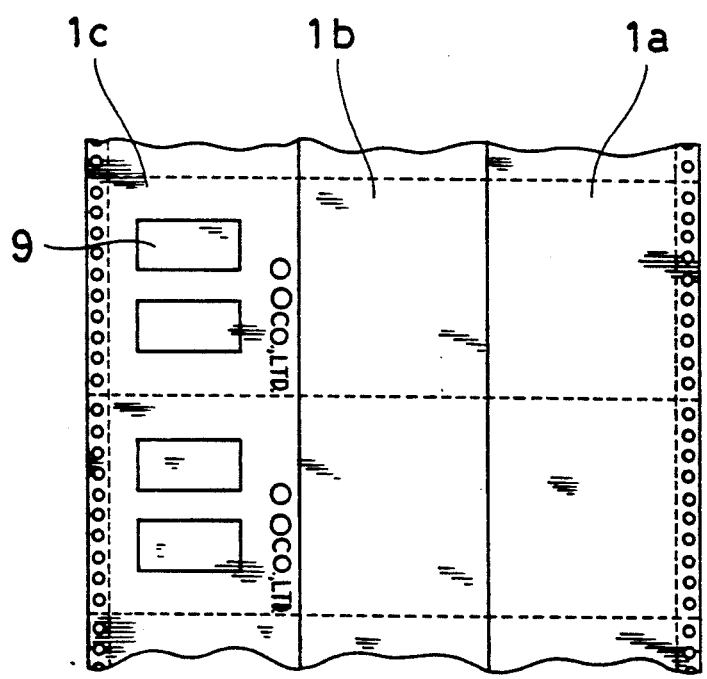

First, as shown in FIG. 4, a lengthwise sheet of paper such as a continuous form 11 having a multiplicity of postcard forming portions 14 is provided in a rolled state. As shown in FIG. 5, this sheet of paper is unrolled and holes 12 are formed by punching in two longitudinal side portions of this sheet, and perforations 13 are also formed in inner portions adjacent to the punched holes 12.

Figure 6:
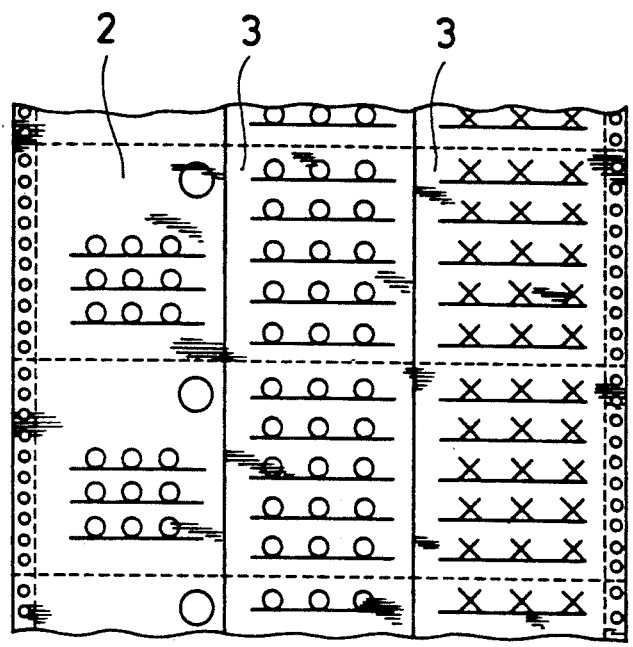

Next, as shown in FIG. 6, an address is printed at a predetermined position in the address display section 2 provided on the first sheet portion 1a, and characters of communication sentences or the like are printed in the information display sections 3 on the second and third sheet portions 1b and 1c. This printing is performed by a printer of an electronic computer by utilizing the punched holes 12 formed in the side portions of the sheet 11.

Figure 7:
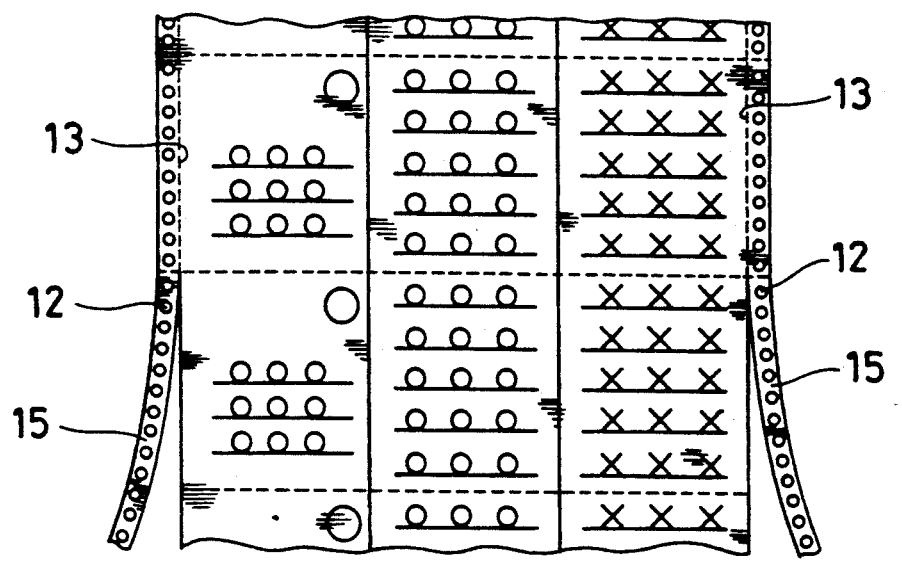
Figure 10:
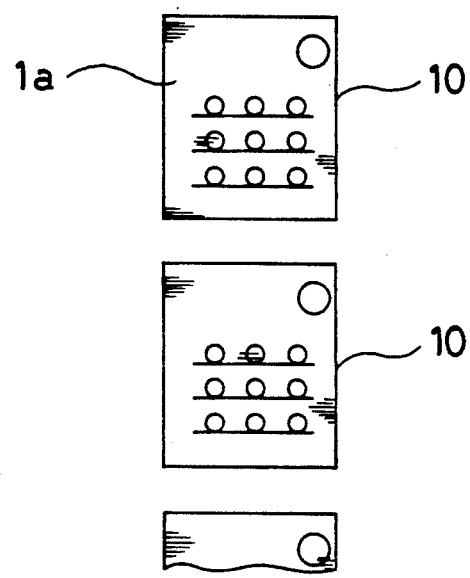

After the printing of such predetermined matters, two edge portions 15 of the sheet 11 having the punched holes 12 are cut off at the perforations 13, as shown in FIG. 7.

Thereafter, as shown in FIG. 8, the sheet 11 is folded in three at the fold portion 4a between the first and second sheet portions 1a and 1b and at the fold portion 4b between the second and third sheet portions 1b and 1c so as to have a Z-like shape in section, and an intermediate sheet 16 such as that of Embodiment 2 is interposed between the second and third sheet portions 1b and 1c. Further, an intermediate sheet 17 comprising the above-described lamination of a biaxially oriented polypropylene film 6 which can be torn in one direction, two synthetic resin layers formed on two surfaces of the film 6, and layers of strong adhesive 7 interposed therebetween is interposed between the first and second sheet portions 1a and 1b.

The sheet 11, which has been folded in three as described above with the intermediate sheets 16 and 17 interposed between the folded portions, and which is in a state shown in FIG. 9, is heated and pressed.

At this time, the synthetic resin layers 5 of the intermediate sheets 16 and 17 are melted by the heat to serve as an adhesive. At the same time, the synthetic resin layers 5, which are ordinarily white and opaque, become transparent. As a result, the sheet portions 1a, 1b, and 1c are bonded by the laminations of the films 6 and the synthetic resin layers 5 formed on the two surfaces of the film 6, each lamination being interposed between the sheet portions 1a and 1 b or the sheet portions 1 b and 1 c.

The effect of making the synthetic resin layers 5 transparent enables the characters to be easily discriminated after unsealing.

Thereafter, the folded sheet is torn at the cutting positions in the direction along the shorter side of the sheet 11 where perforations 18 are formed, and postcards 10 each corresponding to Embodiment 1 are thereby produced successively and automatically.

Since in this case the perforations 18 are formed in the postcard members 1, the postcard members 1 can easily be split at the positions of the perforations 18 into postcard forming pieces 14 by a tearing force. Moreover, since the films 6 interlaid in the postcard member 1 is formed of a biaxially oriented polypropylene which can be torn in the transverse direction of the postcard member 1, they can easily be torn at the perforations 18 by the tearing force.

There is therefore no need to prepare a special cutting machine, and the postcards can be successively manufactured automatically although films are interlaid in them.

In the above-described embodiment, a lengthwise paper sheet 11 is used, but is is also possible to use sheets previously sized in accordance with the postcard forming pieces. In this case, only the lengthwise films are torn apart.

EMBODIMENT 4

Figure 11:
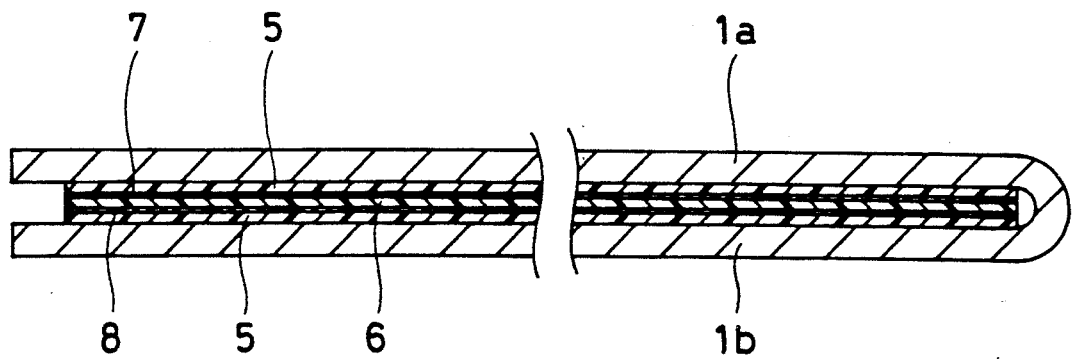
FIG. 11 is a front view of a postcard in accordance with a fourth embodiment of the present invention.

FIG. 11 is an enlarged cross-sectional view of a postcard in accordance with a fourth embodiment of the present invention.

This embodiment differs from Embodiment 1 in that the postcard member 1 is formed of two sheet portions 1a and 1b which can be folded in.

In this embodiment, however, a synthetic resin layer 5 and a layer of strong adhesive 7 comprising chlorinated polypropylene are laminated on the inner surface of the sheet portion 1a, a synthetic resin layer 5 and a layer of weak adhesive 8 are laminated on the inner surface of the sheet portion 1b, and a biaxially oriented polypropylene film 6 which can be torn in one direction is interposed between the layer of strong adhesive 7 and the layer of weak adhesive 8, which construction is the same as that of Embodiment 1.

Accordingly, in this embodiment, the postcard member 1 can be unsealed by separating the film 6 from the weak adhesive 8.

Information display sections 3 are provided on the inner surfaces of the sheet portions 1a and 1b to show desired information. This embodiment is also the same as Embodiment 1 in this respect.

EMBODIMENT 5

This embodiment is an example of a method of manufacturing the post card in accordance with Embodiment 3.

Figure 13:
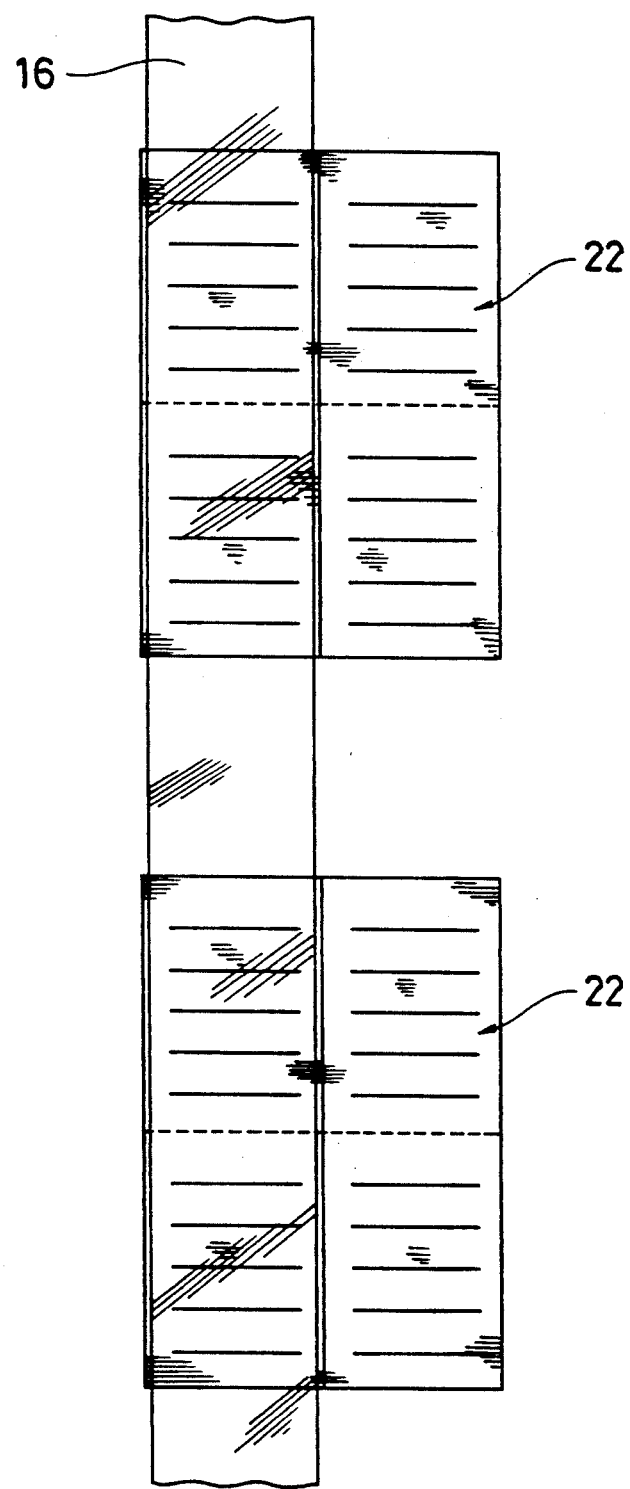

In this embodiment, a multiplicity of sheets 22 from which post cards will be formed are prepared. As shown in FIG. 12, each sheet 22 has a standard size (A4 size) and consists of a pair of postcard forming portions 21 sectioned by perforations 20. Desired information is printed on the sheets 22 by means of a laser printer or the like. The sheets 22 on which the information is printed are transported while being arranged as shown in FIG. 13, and an elongated intermediate sheet 16 having the same four-layer structure as that used in Embodiment 2 is transported so as to be located on the half of each sheet 22 on one side.

Figure 14:
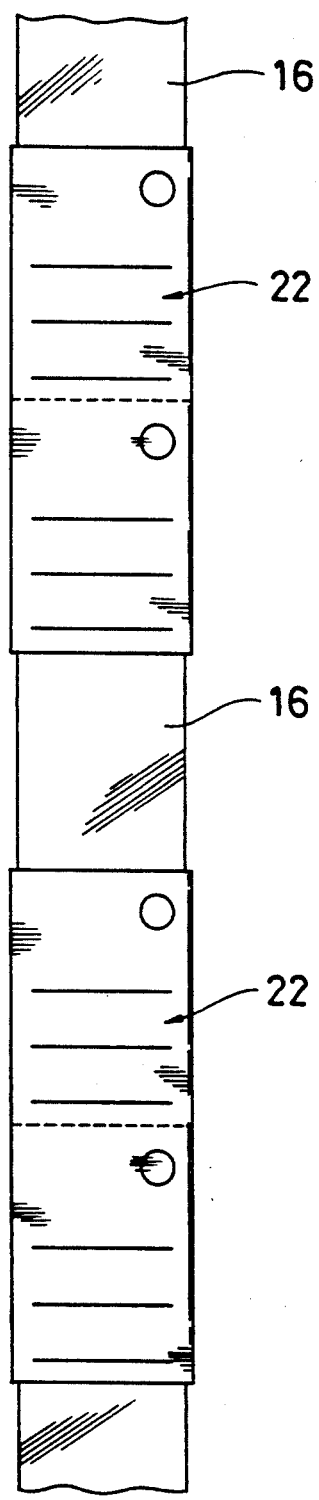

Next, each sheet 22 is folded in two in the longitudinal direction, as shown in FIG. 14, and the folded portions are bonded to each other by heating as in the case of Embodiment 2. The intermediate sheet 16 is thereafter torn apart at each end of the sheet 22, and each sheet 22 is split at the perforations 20 while tearing apart the intermediate sheet 16.

Since the intermediate sheet 16 of this embodiment is also formed of synthetic resin layers 5 and biaxially oriented polypropylene film 6 which can be torn in one direction, the sheet from which postcards are formed can easily be split by a tearing force to make postcards.

To manufacture such a twice-folded postcard, an elongated sheet of paper such as that of Embodiment 2 may be used instead of the sheet 22 for forming postcards of the standard size.

In this embodiment, each sheet 22 consists of two postcard forming portions 14. Alternatively, each sheet 22 may have a size such as to form one postcard.

EMBODIMENT 6

Figure 15:
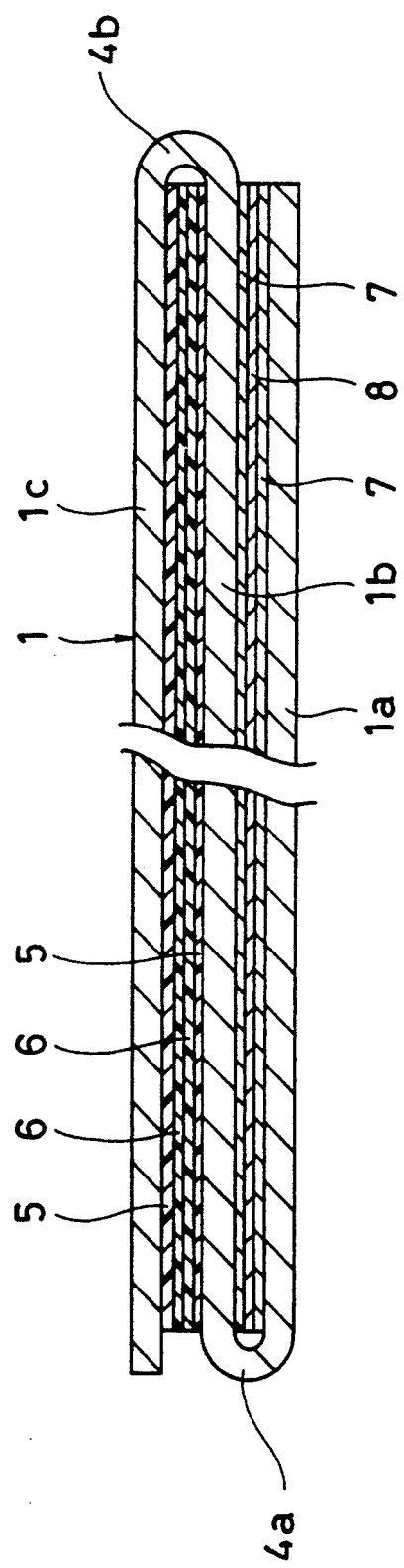
FIG. 15 is an enlarged cross-sectional view of a sixth embodiment of the present invention.
Figure 23A:
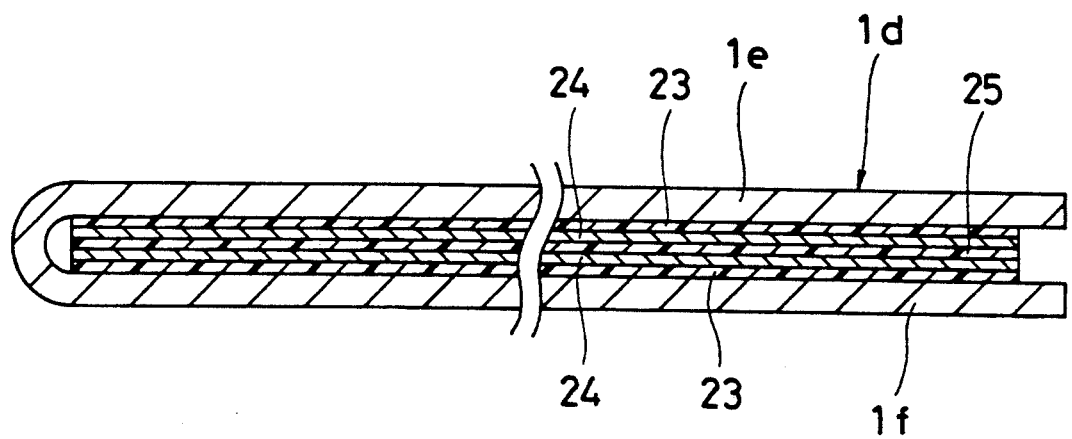
FIG. 23(a) show an example of the conventional postcard.
Figure 23B:
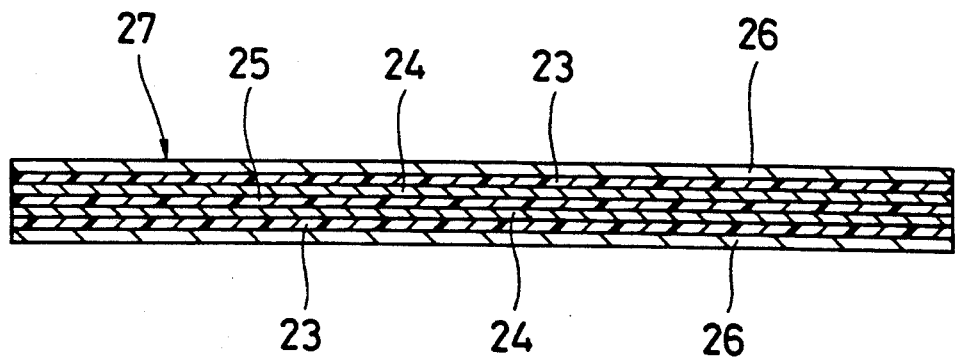
FIG. 23(b) is an enlarged cross-sectional view of the intermediate sheet.

FIG. 15 is an enlarged sectional view of a postcard in accordance with the sixth embodiment of the present invention.

The post card of this embodiment is also folded in three as in the case of Embodiment 1, but includes a different internal structure of the postcard member 1 in which two films 6 are provided.

That is, in this embodiment, two laminated biaxially oriented polypropylene films 6 which can be torn in one direction are interposed between the inner surfaces of the second and third sheet portions 1b and 1c of the postcard member 1, and a layer of synthetic resin 5 comprising ethylene-polyvinyl acetate copolymer resin is interposed between each of the film 6 and the corresponding inner surface of the postcard member 1. The outer surface of each film 6 facing the synthetic resin layer 5 is processed to have suitable bonding properties. The inner surfaces of the films 6 facing each other are not processed, and the two films 6 are separably bonded by lamination.

One film 8 formed of the same material as the films 6 is provided between the inner surfaces of the first and second sheet portions 1a and 1b, and layers of a synthetic resin comprising the same ethylene-polyvinyl acetate copolymer resin as the synthetic resin layers 5 are interposed between the film 8 and the sheet portions 1a and 1b.

In the postcard in accordance with this embodiment, as described above, the second and third sheet portions 1b and 1c are separably bonded to each other with synthetic resin layers 5 and films 6 interposed therebetween. The sheet portion 1c can therefore be easily separated from the sheet portions 1b at the position between the two films 6 laminated as shown in FIG. 16., thereby enabling the information in the information display sections 3 to be easily confirmed as in the case of the postcard of Embodiment 1.

EMBODIMENT 7

FIG. 17 is an enlarged sectional view of a postcard in accordance with seventh embodiment of the present invention.

In this embodiment, the postcard member 1 is folded in two as in the case of Embodiment 3. The internal structure of the postcard 1 is the same as the structure between the sheet portions 1b and 1c of the postcard member 1 in accordance with Embodiment 5.

EMBODIMENT 8

This embodiment includes a postcard intermediate sheet for use in Embodiment 6.

As shown in FIG. 18, the intermediate sheet 16 has two biaxially oriented polypropylene films 6 each of which can be torn in one direction and which are separably attached to each other, and two layers 5 of a synthetic resin comprising ethylene-polyvinyl acetate copolymer resin. The synthetic resin layers 5 are formed on the outer surfaces of the films 6.

OTHER EMBODIMENTS

In the above-described embodiments, a biaxially oriented polypropylene film which can be torn in one direction is used as the film 6 interlaid in the postcard member 1, but the kind of film 6 is not limited to this. For example, a uniaxial oriented polypropylene film can be used. Essentially, any film can be used so long as it can be torn apart.

However, the above-mentioned biaxially oriented polypropylene which can be torn in one direction is most preferable if the strength necessary at the time of working for manufacturing the postcard, the gloss for attracting the attention of a person unsealing the card, and other factors are considered.

In the above-described embodiment, an ethylene-polyvivyl acetate copolymer resin is used as the material of the synthetic resin layer 5 for bonding the film 5 to the inner surface of the postcard member 1, but the kind of material of the synthetic resin layer 5 is not limited to this, and it can be selected from other synthetic resins. Further, the film 6 may be directly bonded to the inner surface of the postcard member 1 by an adhesive without providing any synthetic resin layer 5.

Essentially, the film 6 and one of the pair of sheet portions is separably bonded while the film 6 is non-separably bonded to the other sheet portion.

The form of the postcard member 1 is not limited to the above-mentioned one folded in three, i.e., a generally Z-like shape or folded in two. For example, a sheet to be folded in three or four in a lapping manner as shown in FIGS. 19 or 20 may also be used. Essentially, the postcard member 1 is formed so as to be folded in two or more.

The means for bonding between the inner surfaces of the sheet portions of the postcard member 1 is not limited to the heating means of the above-described embodiments. The sheet portions can be bonded by only being pressurized. In this case, a cold melt bonding agent can be used.

In the above-described embodiments, all the sheet portions are formed into the shape of the standard postcard size. However, the size of the sheet portions is not limited to the standard size. For example, in the case of a twice-folded postcard, only the sheet portion 1a may be formed into the shape of the standard size, while the other sheet portion 1b is formed into the shape of half the standard size, the sheet portion projecting beyond the other sheet portion 1b. In this case, all the address display section 2 and the information display section 3 can be provided on one face of the postcard member 1, so that characters can be printed on the same surface of the continuous form under the control of a computer or the like, that is, the printing operation can be simplified.

The postcards of the present invention includes any kind of postcard, e.g., a printed direct mail, as well as a postcard used in banks, stock companies or the like as a notification card on which characters are printed by a computer line printer as in the case of Embodiment 1, and a postcard on which characters are printed by a laser printer as in the case of Example 3. The various types of postcards in accordance with the present invention can be used for carious purposes, that is, can be specially provided as printing cards, direct mails and so on. In the case of a Z-like threefold postcard like Embodiment 1, the address display section 2 and the information display section 3 are provided on the same face of the postcard member 1, and characters can be printed on one surface of the continuous form 11. This type of postcard is therefore suitable for computer printing.

The present invention is intended mainly for application to postcards. However, the present invention can also be applied to sealed letters and can essentially be applied to any other communication medium which enable communication.

In accordance with the present invention, as described above, a film is interposed between inner surfaces of a communication medium member, and this film can be torn in a transverse direction of the communication medium member. To manufacture such a postcard, a lengthwise sheet of the film is prepared and is interposed between portions of the communication medium sheet, and the inner surfaces of the sheet are bonded to each other through the film. The bonded sheet is thereafter torn at the positions in accordance with the predetermined size of a postcard so that the film can be easily torn in the transverse direction.

Accordingly, if a splitting means such as perforations is provided in the sheet, the sheet can be split while tearing the film. There is no need to provide special cutting machine.

It is therefore possible to manufacture communication mediums successively and automatically from a sheet of paper like a continuous form and a lengthwise film without making the overall construction of the manufacture apparatus complicated.

Since the interposed film can be torn in one direction as mentioned above, the communication medium can easily be torn so that the film interlaid therein is simultaneously torn apart, when the communication medium is torn to pieces and thrown away. The disposal operation is therefore easier than that for the conventional postcards, even though the film is interlaid. In particular, in the case of a communication medium to be handled with certain secrecy, the disposal of the communication medium can be effected promptly by tearing the postcard member 1 immediately after the receiver has read the information after unsealing, as described above. This operation is easier than that required for the conventional communication mediums.

What is claimed is:

1. A communication medium such as a postcard where:
   a communication medium member is formed of a sheet of paper having at least two sheet portions which can be folded in,
   synthetic resin layers are respectively attached to the inner surfaces of said sheet portions facing each other,
   a synthetic resin film is interposed between said synthetic resin layers,
   said synthetic resin film is formed of a biaxially oriented polypropylene film which can be torn in one direction, and said sheet portions are bonded to each other so as to be separable by interlaminar peeling between said synthetic resin layer and said film.

2. A communication medium according to claim 1, wherein said film and said sheet portion are separably bonded to each other while said film and another sheet portion are inseparably bonded to each other.

3. A communication medium according to claim 1, wherein said synthetic resin layer is formed of an ethylene-polyvinyl acetate copolymer resin.

* * * * *